(12) United States Patent
Mammou et al.

(10) Patent No.: US 9,064,311 B2
(45) Date of Patent: Jun. 23, 2015

(54) METHOD FOR COMPRESSING/DECOMPRESSING A THREE-DIMENSIONAL MESH

(75) Inventors: Khaled Mammou, Toulouse (FR); Christophe Dehais, Toulouse (FR)

(73) Assignee: FITTINGBOX, Labege (FR)

( * ) Notice: Subject to any disclaimer, the term of this patent is extended or adjusted under 35 U.S.C. 154(b) by 38 days.

(21) Appl. No.: 13/806,930

(22) PCT Filed: Jun. 29, 2011

(86) PCT No.: PCT/EP2011/060945
§ 371 (c)(1),
(2), (4) Date: Jan. 16, 2013

(87) PCT Pub. No.: WO2012/001070
PCT Pub. Date: Jan. 5, 2012

(65) Prior Publication Data
US 2013/0114910 A1    May 9, 2013

(30) Foreign Application Priority Data

Jun. 29, 2010 (FR) ...................... 10 55211

(51) Int. Cl.
G06K 9/36      (2006.01)
G06K 9/46      (2006.01)
G06T 9/00      (2006.01)
(52) U.S. Cl.
CPC ................ *G06T 9/004* (2013.01); *G06T 9/001* (2013.01)
(58) Field of Classification Search
None
See application file for complete search history.

(56) References Cited

U.S. PATENT DOCUMENTS

| 7,847,799 | B2 * | 12/2010 | Taubin | ......................... 345/424 |
| 2007/0206007 | A1 * | 9/2007 | Taubin | ......................... 345/423 |
| 2007/0291029 | A1 * | 12/2007 | Konev et al. | .................. 345/421 |

OTHER PUBLICATIONS

Chen et al., "Algebraic Analysis of High-Pass Quantization", ACM Transactions on Graphics, 2005, vol. 24, No. 4, pp. 1259-1282.
Cohen-Or et al., "Progressive Compression of Arbitrary Triangular Meshes", IEEE Visualization Conference Proceedings, 67-72, 1999.
Garland et al., "Surface Simplification Using Quadric Error Metrics", International Conference on Computer Graphics and Interactive Techniques, 209-216, 1997.

(Continued)

*Primary Examiner* — Bhavesh Mehta
*Assistant Examiner* — Feng Niu
(74) *Attorney, Agent, or Firm* — Young & Thompson (57) ABSTRACT

The method for encoding/decoding three-dimensional meshes of dots or vertices connected in the form of facets delimited by edges; the mesh M is defined by connectivity data T and geometry data G includes the steps of:
- lossless encoding of the connectivity data T into encoded connectivity data Tc,
- iteratively generating a progressive mesh hierarchy, i.e. a set of meshes with progressive levels of detail, PM(M*),
- generating a piecewise smooth approximation M* of the original mesh M, from the mesh connectivity T; this smooth approximation M* being described as follows:
  a. compressed connectivity data Tc;
  b. a small number N of control dots and
  c. a number of indexes S of edges called protruding edges of the mesh M, identified beforehand,
- using the progressive mesh hierarchy PM(M*) to calculate a prediction of approximation errors in M* compared with the original mesh M.

11 Claims, 4 Drawing Sheets

(56) References Cited

OTHER PUBLICATIONS

Karni et al., "Spectral Compression of Mesh Geometry", International Conference on Computer Graphics and Interactive Techniques, 279-286, 2000.

Mamou et al., "TFAN: A low complexity 3D mesh compression algorithm", Computer Animation and Virtual Worlds, vol. 20 Nos. 2-3, pp. 343-354, 2009.

Peng et al., "Geometry-guided Progressive Lossless 3D Mesh Coding with Octree (OT) Decomposition", ACM Transactions on Graphics, vol. 24, No. 3, pp. 609-616, 2005.

Popovic et al., "Progressive Simplicial Complexes", ACM SIGGRAPH Conference, pp. 217-224, 1997.

Taubin et al., "Progressive Forest Split Compression", International Conference on Computer Graphics and Interactive Techniques, pp. 123-132, 1998.

Touma et al., "Triangle Mesh Compression", International Conference on Graphics Interface, pp. 24-34, 1998.

Alliez et al., "Progressive Compression for Lossless Transmission of Triangle Meshes", ACM Siggraph Conference Proceedings, pp. 198-205, 2001.

Mamou et al., "Shape Approximation for Efficient Progressive Mesh Compression", Proceeding of 2010 IEEE 17th International Conference on Image Processing, Sep. 2010, pp. 3425-3428, XP031814533.

Mamou et al., "PTFAN: a multi-resolution extension for the TFAN codec" 91. Mpeg Meeting, Jan. 18, 2010, Jan. 22, 2010; Kyoto; Jan. 2010, XP030045768.

Zhihong et al., "A Modified Laplacian Smoothing Approach with Mesh Saliency", Jan. 2006, Smart Graphics Lecture Notes in Computer Science, pp. 105-113, XP019041505.

Cheng et al., "Anchors-Based Lossless Compression of Progressive Triangle Meshes", Proceedings of Pacific Graphics 2006, pp. 45-50, XP002624295.

Lee et al., "Mesh Saliency", ACM Transactions on Graphics, vol. 24, 2005, pp. 659-666, XP002624296.

Zhao et al.,"Triangular Surface Mesh Fairing via Gaussian Curvature Flow", Journal of Computational and Applied Mathematics, vol. 195, No. 1-2, Oct. 2006, pp. 300-311, XP024932969.

Li et al.,"A New Feature-Preserving Mesh-Smoothing Algorithm", The Visual Comput, 2009, vol. 25. No. 2, pp. 139-148, XP019711674.

Nealen et al., "Laplacian Mesh Optimization", Proceedings of The 4th International Conference on Computer Graphics and Interactive Techniques in Australasia and Southeast Asia, Nov. 2006, pp. 381-389, XP002624297.

International Search Report, dated Jan. 11, 2012, from corresponding PCT application.

* cited by examiner

METHOD FOR COMPRESSING/DECOMPRESSING A THREE-DIMENSIONAL MESH

This invention falls within the field of image processing. It relates more specifically to the image compression and decompression methods required for transmitting them and minimizing the required bandwidth.

BACKGROUND OF THE INVENTION AND PROBLEM STATEMENT

Over the last few years, the number of software applications using 3D images has grown exponentially: online video games, telemedicine, geographic information system, etc. The processing for these applications is made possible by the general availability of ever faster graphics processing units, as well as by the emergence of powerful 3D modeling tools and devices for directly capturing the three dimensional shapes of objects. Consequently, generated 3D content is increasingly rich and detailed.

This content is generally defined by a set of dots or vertices, connected in the form of facets, which are in turn delimited by edges. Such an arrangement is known as "M mesh".

Faced with this data, whose volume increases rapidly with the new applications for 3D images, the information transmission networks remain very heterogeneous and their bandwidth, although increasing, remains low, in view of the number and volume of files that must be transmitted over these networks, even though it is increasing. Lastly, the platforms designed to receive images of three-dimensional objects are increasingly varied: mobile phones, tablets, micro-computers, PDAs etc.

It is therefore understood that the efficient exchange of complex three-dimensional models over these networks and machines becomes a crucial issue for many industrial applications, including, for example, photorealistic rendering, medical visualization and simulation.

In addition, certain applications that use three-dimensional models, particularly in the fields of medicine and engineering, require lossless recovery of the M Mesh connectivity (i.e. without remeshing) and precise verification of the maximum or mean error rate induced by the compression of its geometry (i.e. the positions and properties associated to the vertices of M).

These considerations explain the requirement for efficient compression methods for three-dimensional meshes, specifically designed for very dense meshes, with near-lossless encoding of the M mesh without remeshing, while providing advanced features such as spatial and quality scalability.

Spatial scalability is defined here as the ability to adjust the resolution of the M mesh to the rendering performance of the image restitution terminal and to the bandwidth available for transmission.

Similarly, quality scalability is defined as the ability to refine the accuracy of the attributes and coordinates progressively, in step with the data stream being decoded.

It is recalled that connectivity coding of is said to be lossless if it preserves the initial triangulation of the original M mesh.

Several techniques are already known in the field of three-dimensional compression.

Figure 1:
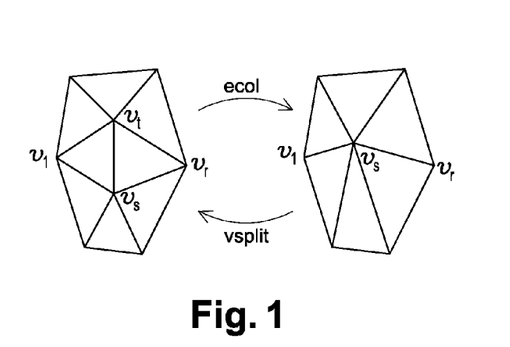
FIG. 1 (previously mentioned): a schematic representation of a progressive mesh method.

Among these, the progressive mesh ("PM") method can be mentioned in particular [Hoppe'96] (Hugues Hoppe, "Progressive meshes", *International Conference on Computer Graphics and Interactive Techniques*, 99-108, 1996). In this, as illustrated in FIG. 1, the M mesh evolves by division of one vertex into two vertices or by fusion of two vertices into a single one, and the joint modification of the associated edges and facets (addition or deletion of two facets). This method makes it possible to generate a set of intermediate meshes called Levels of Details or LoD. This representation is suitable for a progressive transfer of the 3D model as well as for View dependent rendering.

However, this method's compression performance is limited and only applies to Oriented manifolds.

Figure 2:
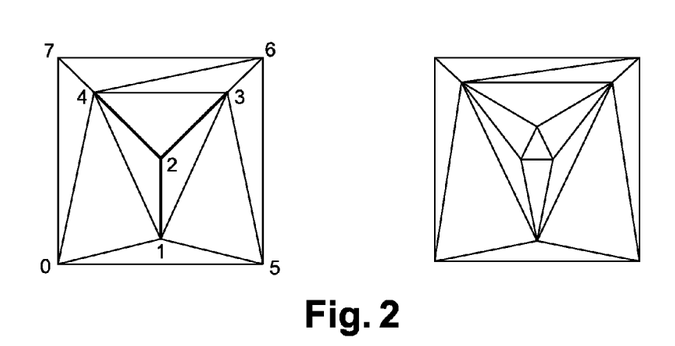
FIG. 2 (also previously mentioned): a schematic representation of a "Progressive Forest Split" mesh method.

In another method, known as Progressive Forest Split (PFS) [Taubin'98] (G. Taubin, A. Guéziec, W. Horn, F. Lazarus, "Progressive forest split compression", *International Conference on Computer Graphics and Interactive Techniques*, 123-132, 1998), the mesh is refined by applying splitting operations simultaneously to a set of vertices of the mesh. In the example illustrated in FIG. 2, a vertex is replaced by a set of three vertices, and four new facets are generated as a result. By combining the vertex splitting operations, the PFS approach makes it possible to code these in more compact form, with coarser granularity of the levels of detail as a consequence. Progressive transmission and rendering are achieved again here. The compression performance is better than that of the PM algorithm, but the quality of the levels of detail of the intermediate models is lower.

Figure 3:
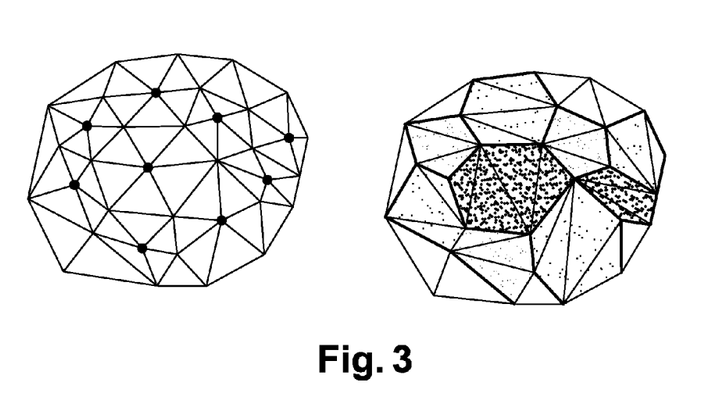
FIG. 3 (also previously mentioned): a schematic representation of a "Patch Coloring" mesh method.

Another strategy is known as "Patch Coloring" (PC) [Cohen-Or'99] (D. Cohen-Or, D. Levin, O. Remez, "Progressive Compression of Arbitrary Triangular Meshes", *IEEE Visualization Conference Proceedings*, 67-72, 1999). In this method, a strategy of facet simplification is used, as illustrated in FIG. 3. This method yields good compression performance and is applicable to all types of meshes. Here again, however, the quality of the levels of detail of the intermediate models is sub-optimal.

Yet another simplification strategy is known as the "Valence-driven decimation approach". [Alliez'01] (P. Alliez, M. Desbrun, "Progressive encoding for lossless transmission of 3D meshes", *ACM Siggraph Conference Proceedings*, 198-205, 2001). In this approach, the vertex decimation strategy utilizes the connectivity of the vertices to minimize the dispersion of the vertices' valences to around the value six, at each intermediate Level of Detail. This method's compression performance is good, but it generates poor quality levels of detail in the case of meshes sampled in an irregular manner. In addition, its application is limited to specific meshes called oriented manifolds.

Compression by octree structure can also be mentioned [Peng'05] (J. Peng, C.-C. J. Kuo, "Geometry-guided progressive lossless 3D mesh coding with octree (OT) decomposition", *ACM Transactions on Graphics*, Vol. 24(3), 609-616, 2005), which yields good compression performance and is applicable to all types of meshes. However, this method provides low-quality levels of detail in the case of smooth 3D meshes.

Lastly, spectral encoding [Karni'01] (Z. Karni, C. Gotsman, "Spectral compression of mesh geometry", *International Conference on Computer Graphics and Interactive Techniques*, 279-286, 2000) performs single rate mesh connectivity compression. This information is then utilized to decompose the geometry signal according to a database of functions adapted to the mesh. The compression performance of spectral encoding is good in the case of smooth 3D meshes. However, the calculations are highly complex. In addition, this method only supports quality scalability (the ability to refine the accuracy of the attributes and coordinates progressively, in step with the data stream being decoded).

In summary, the compression techniques that utilize connectivity (i.e. PFS, PC and valence-driven encoding) allow gains in compression compared to the original progressive mesh approach, but at the cost of sub-optimal quality of the intermediate levels of detail. Compression by octree structures uses a simplification criterion that is not suitable for meshes. Lastly, spectral encoding is complex and does not allow spatial scalability.

In [Karni'01], the authors propose utilizing the Touma and Gotsman (TG) technique [Touma'98] (C. Touma, C. Gotsman, "Triangle Mesh Compression", *International Conference on Graphics Interface*, 24-34, 1998) in order to encode the connectivity information in single rate (i.e. with no scalability). The TG encoder encodes the mesh connectivity in the form of a sequence of valences. This encoder generates oriented manifolds. The TFAN approach [Mammou'09] (K. Mamou, T. Zaharia, F. Prêteux, "TFAN: A low complexity 3D mesh compression algorithm", Computer Animation and Virtual Worlds, Vol. 20(2-3), 343-354, 2009) generalizes the TG technique to all types of 3D meshes.

OBJECTIVES OF THE INVENTION

Consequently, the objective of this invention is to propose a compression method that makes possible spatial and quality scalability, with encoding without loss of generic connectivity (i.e. manifolds or not, oriented or not, open and closed) and near-lossless encoding (with a controlled maximum/mean error rate) of the mesh geometry.

DESCRIPTION OF THE INVENTION

To this end, the invention envisages in a first aspect a method for encoding/decoding three-dimensional meshes of dots or vertices connected in the form of facets delimited by edges; the mesh M is defined by connectivity data T and geometry data G;
the method comprises:
  a step of lossless encoding of the connectivity data T into encoded connectivity data Tc,
  a step of iteratively generating a progressive mesh hierarchy, i.e. a set of meshes with progressive levels of detail, PM(M*),
  a step of generating a piecewise smooth approximation M* of the original mesh M, from the mesh connectivity T; this smooth approximation M* is described as follows:
  a. the encoded connectivity information Tc (the list of triangles of the mesh M),
  b. a small number N of control dots $C=(c_k)_{k \in \{1, \ldots, N\}}$, previously defined and
  c. a set of indexes (their references in the mesh) S of edges, called protruding edges, of the mesh M, identified beforehand.
    the progressive mesh hierarchy PM(M*) is used to calculate a prediction of approximation errors in M* compared with the original mesh M.

According to an advantageous implementation, the approximate mesh M* is generated according to a Laplacian technique, which has been generalized to the case of meshes comprising protruding edges, in that a Laplacian matrix L is defined, in which weights ($\alpha$, $\beta$) are associated with the special edges (protruding or outer edges) and with the non-special edges; this makes it possible to assign different weights to the contribution of vertices close to a dot depending their belonging to the two sets of special topological neighbors, which are defined as sharing with same either an outer edge or a protruding edge, and normals $i_s^*$ and $i_n^*$.

Advantageously, in this case the following values are used: $\alpha=100$ and $\beta=1$.

According to particular implementation, the progressive mesh hierarchy PM(M*) is generated by decimation of the approximate mesh M* by allowing only reversible half-edge collapse operations until a base mesh $M_0$ is reached; the original mesh M is then constructed as the base mesh $M_0$ associated with a set of operations of refining by vertex splitting.

According to an advantageous implementation, the method also comprises a step in which:
  the predicted approximation errors are encoded in the reverse order of PM(M*);
  the approximation error $e_v$ is decomposed into a component normal to the mesh M*: $e_v^n$ and two tangential components $e_v^t$ and $e_v^r$, which are transmitted progressively to the decoder 200.
  at the time of decoding, the predicted approximation errors are decoded progressively starting from the lowest level of detail $M_0$ to the highest level of detail M,
  the decoded positions of the vertices are calculated.

According to another advantageous implementation, possibly used jointly, the method comprises the following steps in addition:
  of encoding versions of intermediate connectivity levels of detail and of progressive transmission thereof;
  of transmitting the coarsest version $M_0$ of the mesh hierarchy (with connectivity and geometry) by using a TFAN type of single rate encoder;
  and, iteratively, of predicting the geometry of the next level of detail $M_{i+1}$ based of the vertices of M, with the vertices of $M_i$ being used as control dots for $M_{i+1}$;
    the following having been previously transmitted: the connectivity C(i+1) of $M_{i+1}$ and an auxiliary item of information annotated Map(i→i+1), which describes the correspondence between the vertices of $M_i$ and of $M_{i+1}$;
    a calculation of an approximate version of $M_{i+1}$, annotated $M_{i+1}^*$ being realized by the decoder by utilizing $M_i$, Map(i→i+1) and C(i+1);
    of using $M_{i+1}^*$ as predictor of $M_{i+1}$, with the prediction errors being encoded/decoded progressively;

Under a second aspect, the invention envisages a decoding method to proceed as described above, such that, during the reconstruction of all the vertices' positions, the predicted approximation errors that are not yet available are set to zero, and in that, in step with the interpretation of the binary flow, the prediction errors are decoded and utilized to progressively correct the positions of the vertices of the mesh.

According to yet another aspect, the invention envisages an encoder for three-dimensional meshes comprising:
  means of receiving and storing:
  connectivity data T,
  geometry data G,
  references of user-selected "control dots" Cs (these dots make it possible to generate an approximate version of the original mesh M, where a subset represents 1% of the vertices of the mesh),
  a single rate type of connectivity encoder, i.e. without scalability, designed for lossless encoding of the connectivity data T into compressed connectivity data Tc,
  a quantization module designed to process the geometry data G in order to reduce the volume of information to be transmitted for each vertex, a control dot selection module utilizing: the quantized geometry data $G_Q$; the compressed connectivity data Tc; and the user control dot data Cs to provide the selected control dots C;

a protruding edge detection module, designed to use the compressed connectivity data Tc and the geometry data;

a binarization module to produce the compressed indexes of the protruding edges $S_C$ and the compressed indexes and positions of the control dots $C_C$;

a mesh approximation module designed to integrate the selected control dot data C and the compressed connectivity data Tc; this mesh approximation module generates an approximate mesh M*;

a mesh decimation module, designed to provide a progressive mesh PM(M*) based on the approximate mesh M* and the quantized geometry data $G_Q$;

a prediction module for approximation errors $e_v$, designed to use the data output from the mesh decimation module from which compressed error prediction data $e_{vc}$ are output, after compression by an arithmetical encoder;

and means of transmitting:
compressed connectivity data Tc;
compressed indexes of protruding edges $S_C$;
compressed indexes and positions of the control dots $C_C$;
and compressed error prediction data $e_{vc}$.

According to an advantageous embodiment, the mesh approximation module is designed to generate the approximate mesh M* according to a Laplacian technique, which has been generalized to the case of meshes comprising protruding edges.

According to a particular embodiment, the encoder comprises means of generating a Laplacian matrix L, in which weights ($\alpha$, $\beta$) are associated with the special edges (protruding or outer edges) and with the non-special edges; this makes it possible to assign different weights to the contribution of vertices close to a dot depending their belonging to the two sets of special topological neighbors, which are defined as sharing with same either an outer edge or a protruding edge, and normals $i_s^*$ and $i_n^*$.

According to yet another aspect, the invention envisages a decoder for three-dimensional meshes comprising:
means of receiving and storing:
compressed connectivity data Tc;
compressed indexes of protruding edges $S_C$;
compressed indexes and positions of the control dots $C_C$;
and compressed error prediction data $e_{vc}$;

a single-rate connectivity decoder designed to provide reconstituted connectivity data T' from the compressed connectivity data Tc;

an inverse binarization module designed to provide indexes of the protruding edges S', indexes and positions of the control dots C' and compression error prediction data $e_v'$;

a mesh approximation module designed to combine reconstituted connectivity data T', indexes of protruding edges S and indexes and positions of the control dots C';

a mesh decimation module designed to use the approximate mesh M* to obtain a progressive mesh PM(M*)

an inverse approximation error prediction module designed to combine the progressive mesh data PM(M*) with the compression error prediction data $e_v'$;

an inverse quantization module able to provide reconstituted geometry data G' based on the results of the inverse approximation error prediction module.

BRIEF DESCRIPTION OF THE FIGURES

The description that follows, given solely as an example of an embodiment of the invention, is made with reference to the figures included in an appendix, which represent.

DETAILED DESCRIPTION OF AN EMBODIMENT OF THE INVENTION

The method as described is intended to be implemented by electronic means, either in the form of a dedicated component or in the form of a software program executed by a computer processor of a type known to experts.

A mesh M is considered, which, in this example, is intended to make it possible to represent a person. Here, the method is applied to static meshes or to specific frames in a sequence of animated meshes.

Figure 4:
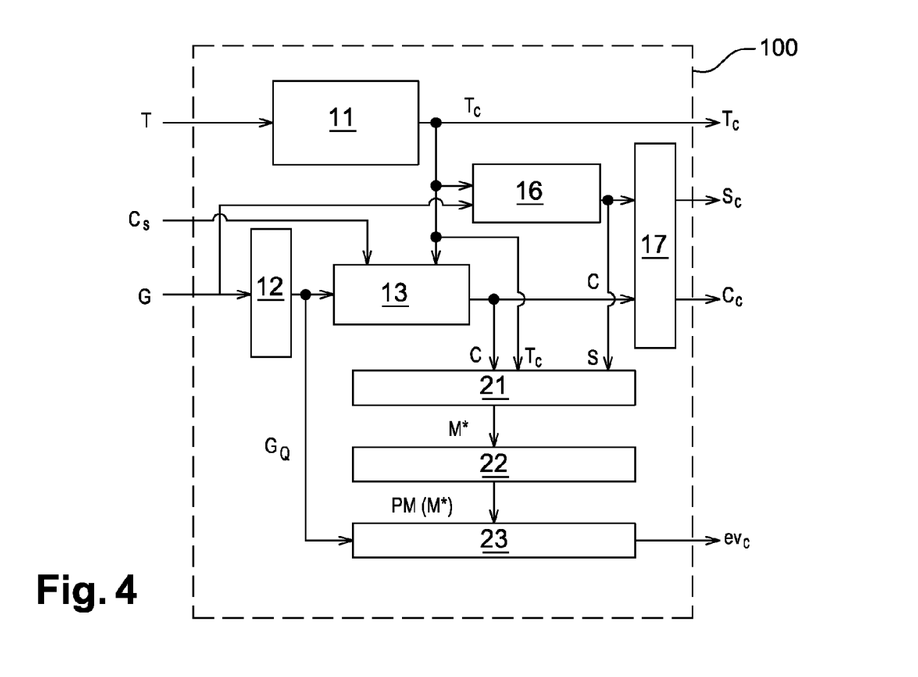
FIG. 4: a logic diagram representing an encoder according to the invention.

FIG. 4 illustrates the logical elements that make up an encoder 100, which corresponds to a non-limiting implementation of the invention.

Three types of data are used as input to the encoder 100:
connectivity data T,
geometry data G,
and possibly, references of user-selected "control dots" Cs (these dots make it possible to generate an approximate version of the original mesh M).

In compliance with the method described here as a non-limiting example, the connectivity data T are encoded using a single-rate type of connectivity encoder 11, which is known to experts and not detailed here. The result of this is compressed connectivity data Tc.

The geometry data G are processed in a quantization module 12. The objective of this quantization module is to reduce the volume of information to be transmitted by decreasing the number of bits per vertex.

Next, the quantized geometry data $G_Q$ output from this quantization module 12, as well as the compressed connectivity data Tc provided by the connectivity encoder 11 and the control dot data Cs are processed by a control dot selection module 13 to provide the selected control dots C.

The compressed connectivity data Tc and the geometry data G are fed to a protruding edge detection module 16, the results from which are compressed within an arithmetic encoder 17 to produce the compressed indexes of protruding edges $S_C$.

Similarly, the selected control dots C are compressed by this same arithmetic encoder 17 to provide the compressed indexes and positions of the control dots $C_C$.

A mesh approximation module 21 integrates the selected control dot data C and the compressed connectivity data Tc. This mesh approximation module 21 generates an approximate mesh M*.

The approximate mesh M* feeds a mesh decimation module 22. The quantized geometry data $G_Q$, as well as the progressive mesh PM(M*) output from module 22, constitute the input to a prediction module 23 for approximation errors $e_v$, from which compressed error prediction data $e_{vc}$ are output, after compression by an arithmetical encoder (not shown in FIG. 4).

It is understood that four types of data are provided on output from the encoder 100:
compressed connectivity data Tc;
compressed indexes of protruding edges $S_C$;
compressed indexes and positions of the control dots $C_C$;
and compression error prediction data $e_{vc}$;

These data items are transmitted step by step by a communications network of a type known to experts and not detailed here. This communications network per se is outside the framework of the invention.

Figure 5:
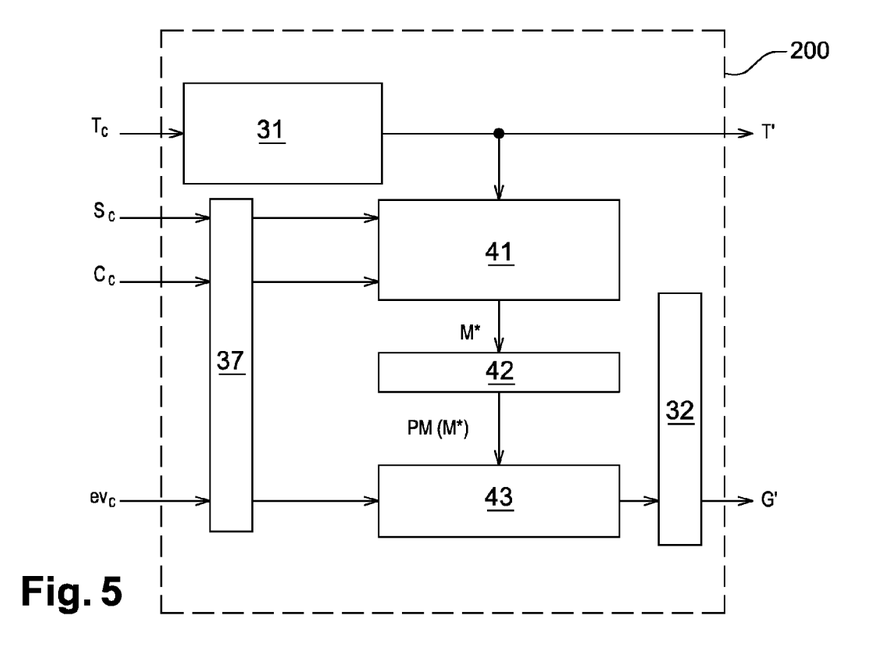
FIG. 5: a logic diagram representing a decoder according to the invention.

FIG. 5 then illustrates the logical elements constituting a decoder 200 according to the invention.

Its input data are the data output from the encoder 100.

The compressed connectivity data Tc are processed in a single-rate connectivity decoder 31, which provides reconstituted connectivity data T'. It is noted that T' is identical to T with the exception of a permutation of the vertices and facets of M.

The compressed indexes of the protruding edges $S_C$, the compressed indexes and positions of the control dots $C_C$ and the compressed error prediction data $e_{vc}$ are processed by an arithmetic decoder 37; this provides indexes of the protruding edges S', indexes and positions of the control dots C' and compression error prediction data $e_v$'.

The reconstituted connectivity data T' are combined with the indexes of the protruding edges S' and with the indexes and positions of the control dots C' in a mesh approximation module 41. The latter provides an approximate mesh M*, which feeds a mesh decimation module 42.

The PM(M*) data output from the mesh decimation module 42 are then combined with the compression error prediction data $e_v$' in an inverse approximation error prediction module 43. Lastly, an inverse quantization module 32 outputs reconstituted geometry data G' based on the results of the inverse approximation error prediction module.

The data output from the decoder 200 are therefore the reconstituted connectivity data T' and the reconstituted geometry data G'.

Operating Mode

The compression/decompression method according to the invention takes advantage of the fact that the connectivity information T represents less than 20% of the complete flow of compressed data that represents the mesh M. Because of this, it compresses this connectivity information T in single-rate by using the connectivity encoder 11. The connectivity information Tc of the mesh M, encoded losslessly, is then used to compress scalably the geometry information G.

More specifically, the method as described here utilizes the mesh connectivity T to derive a smooth approximation M* of the original mesh M.

This smooth approximation M* is entirely described by the three inputs to the mesh approximation module 21, i.e.:
a. the encoded connectivity information Tc (i.e. the list of triangles of the mesh M),
b. a small number N of control dots $C=(c_k)_{k \in \{1, \ldots, N\}}$ and
c. a set of indexes (i.e. their references in the mesh) S of edges, called protruding edges, of the mesh M (see definition below).

It is recalled that the control dots are chosen by the user and/or by an automatic procedure to ensure that the approximate mesh M* is the most faithful rendition possible of the original mesh M.

Several automatic strategies can be adopted to choose the set of control dots. As an example of implementation, if no control dot is supplied by the user, a first control dot is chosen randomly. The mesh is approximated by using the control dots already defined (i.e. either the control dots defined by the user or the control dot selected randomly). Iteratively, new control dots are then selected. More specifically, the vertex with the maximum approximation error is selected at each iteration. This process is reiterated until the desired number of control dots is reached. This is an encoding parameter, which is generally of the order of 1-3% of the number of vertices of the original mesh M.

This encoding/decoding method uses, in this mesh approximation module 21, a Laplacian mesh approximation technique known per se and described in particular in [Chen'05] (D. Chen, D. Cohen-Or, O, Sorkine, and S. Toledo, "Algebraic analysis of high-pass quantization," ACM Transactions on Graphics, vol. 24, pp. 1259-1282, 2005).

This technique is here generalized to the case of meshes comprising protruding edges, A Laplacian matrix L is defined as follows:

$$\forall (i,j) \in \{1, \ldots, V+C\} \times \{1, \ldots, V\} \quad (1)$$

$$L_{i,j} = \begin{cases} 1 & \text{if } (j=i) \\ -\dfrac{\alpha}{\alpha |i_s^*| + \beta |i_n^*|} & \text{if } (i \leq V) \text{ and } (j \in i_s^*) \\ -\dfrac{\beta}{\alpha |i_s^*| + \beta |i_n^*|} & \text{if } (i \leq V) \text{ and } (j \in i_n^*) \\ 1 & \text{if } (j \in C) \\ 0 & \text{otherwise} \end{cases}$$

in which:

$i_s^*$ is the set of special topological neighbors of vertex i, defined as sharing with it either an outer edge (i.e. adjacent to exactly one triangle) or a protruding edge;

$i_n^*$ is the set of "normal" topological neighbors of vertex i, defined as topological neighbors not belonging to $i_s^*$, $/i_n^*/$ and $/i_s^*/$ designate the number of elements in $i_n^*$ and $i_s^*$ respectively, $\alpha$, $\beta$ are weights respectively associated with the special edges (protruding or outer edges) and with the non-special edges; It should be noted that if the weights $\alpha$ and $\beta$ are equal or if there is no protruding edge, the definition of the Laplacian matrix proposed by [Chen'05] is obtained exactly. Where the mesh has protruding edges, the weights $\alpha$ and $\beta$ make it possible to assign different weights to the contributions of the neighboring vertices depending on their belonging to the two sets $i_s^*$ and $i_n^*$.

In this implementation example, one choice envisaged is to set $\alpha=100$ and $\beta=1$. This implies that a vertex i, located at an edge of the mesh or on a protruding edge, is influenced one hundred times more by its special neighbors $i_s^*$ than by its non-special neighbors $i_n^*$.

Different procedures can be used for detecting protruding edges. One possible solution is to define protruding edges as being all edges that have a dihedral angle greater than a predefined value (e.g. $\pi/6$). These edges are generally a result of tangential discontinuities of the surface. The [Chen'05] technique does not handle this type of surface efficiently, since protruding edges are smoothed. In contrast, the method proposed here makes it possible to retain these characteristics better.

As in [Chen'05], the matrix of size (V×3) of the approximate positions of the vertices, annotated $P^* = (P_v^*(k))_{v \in \{1, \ldots, V\}}^{k \in \{1, 2, 3\}}$, is calculated by resolving the following linear system:

$$(L^T L) P^* = B. \tag{2}$$

The matrix B of size (V×3) is given by:

$$B_{i,k} = \begin{cases} P_i(k) & \text{if } (i \in C) \\ 0 & \text{otherwise} \end{cases} \tag{3}$$

where $P_i(1)$, $P_i(2)$ and $P_i(3)$ represent respectively the native Cartesian coordinates x, y and z of the vertex i.

A progressive mesh hierarchy, annotated PM(M*), is then generated by decimation of the approximate mesh M*, allowing only half-edge collapse operations. The progressive mesh technique PM (previously mentioned and illustrated in FIG. 1) represents the original mesh M as a base mesh $M_0$ associated with a set of operations of refining by vertex splitting.

The base mesh $M_0$ is obtained by successive decimations of the mesh M by edge collapse operations. The choice of the sequence of edge collapse operations to apply to the mesh M is guided by a strategy of shape retention.

More specifically, according to this strategy, at each step of the decimation process, a function of the cost of applying each edge collapse operation is evaluated so as to choose the operation that introduces the least shape distortion, as described in [Garland'97] (M. Garland, P. Heckbert. "Surface Simplification Using Quadric Error Metrics", International Conference on Computer Graphics and Interactive Techniques, 209-216, 1997).

As discussed in [Popovic'97] (J. Popovic, H. Hoppe, "Progressive simplicial complexes", *ACM SIGGRAPH Conference*, 217-224, 1997), every edge collapse operation is reversible, subject to having stored the following:
- the index of the vertex to be split;
- its position and attributes; and
- the modifications made to the triangles/edges which are topologically incident thereon.

By making use of this fact, a set of refining operations, annotated $(vsplit_l)_{l \in \{1, \ldots, K\}}$ (where K is the number of levels of detail in the mesh hierarchy, i.e. $M=M_K$), can be calculated and utilized to progressively regenerate the mesh M starting from the base mesh $M_0$. More specifically, by applying the operation $vsplit_1$ to $M_0$, the level of detail $M_1$ is obtained. By applying the operation $vsplit_2$ to $M_1$, the level of detail $M_2$ is obtained. And so on until the original mesh M is rebuilt. At each step $l \in \{1, \ldots, K\}$ of this refining process, a new vertex $v_r(l)$ is added to the level of detail $M_{l-1}$ and the neighborhood of vertex $v_s(l)$ is modified (see FIG. 1). The order in which the vertices $v_r(l)$ are inserted is called "order of the progressive mesh". It is noted that the list of neighbors of the vertex $v_s(l)$ changes between the two levels of detail $M_{l-1}$ and $M_l$ (see FIG. 1.) From here on, "topological neighbors of a vertex in relation to a level of detail l" will be used.

The proposed method builds the progressive mesh hierarchy PM(M*) by considering M* (rather than M). The reason for this choice is that only this item of information is available to both the encoder 100 and the decoder 200. The progressive mesh PM(M*) is then utilized so as to calculate a prediction of approximation errors of M* in relation to M. The encoder as described compresses the predicted approximation errors reverse order of PM(M*).

At each step, the predicted approximation error e associated with the vertex v is calculated as follows:

$$e_v = \left(P_v - \frac{1}{v^*}\sum_{w \in v^*} \hat{P}_w\right) - \left(P_v^* - \frac{1}{v^*}\sum_{w \in v^*} P_w^*\right), \tag{4}$$

in which $v^*$ represents the set of topological neighbors of v in the current level of detail of PM(M*) and $(\hat{P}_w)_{w \in v^*}$ are the positions reconstructed by the decoder 200, as described below (see equation (7)).

The approximation error $e_v$ obtained is then decomposed into one component normal to the mesh M* $e_v^n$ and two tangential components $e_v^t$ and $e_v^r$ defined by:

$$e_v^n = e_v \cdot n_v^*, e_v^t = e_v \cdot t_v^*, e_v^r = e_v \cdot r_v^*, \tag{5}$$

where $n_v^*$ is the normal of mesh M* at the vertex v and r and t are two vectors chosen to form a direct orthonormal base with $n_v^*$.

Lastly, $e_v^n$, $e_v^t$ and $e_v^r$ are quantized and arithmetically encoded for all the vertices v of the mesh. The compressed approximation errors, annotated $e_{v,c}$, are then transmitted progressively to the decoder 200.

The decoder 200 progressively decompresses the predicted approximation errors from the lowest level of detail (i.e. $M_0$) to the highest level (i.e. $M_K$). Here, at each step, the three components $e_v^n$, $e_v^t$ and $e_v^r$ are arithmetically decoded (in module 37) then used (in module 43) to reconstruct the approximation error as follows:

$$\hat{e}_v = \hat{e}_v^n \cdot \hat{n}_v^* + \hat{e}_v^t \cdot \hat{t}_v^* + \hat{e}_v^r \cdot \hat{r}_v^* \tag{6}$$

Lastly, the decoded positions (i.e. the reconstituted geometry G') are given by:

$$\hat{P}_v = \hat{e}_v + \frac{1}{v^*}\sum_{w \in v^*} \hat{P}_w + \left(P_v^* - \frac{1}{v^*}\sum_{w \in v^*} P_w^*\right) \tag{7}$$

It should be noted that by encoding and decoding the vertices in the inverse order of the progressive mesh hierarchy PM(M*), this encoding/decoding method guarantees that, at the time vertex v is processed, all its neighbors have already been reconstructed.

In addition, by using the progressive mesh structure PM(M*), the encoder/decoder, as described here, makes it possible to provide the spatial scalability function directly (the ability to adjust the resolution of the M mesh to the rendering performance of the image restitution terminal and to the bandwidth available for transmission).

Spatial scalability is provided by utilizing the progressive mesh structure PM(M*) and by the fact that the meshes M and M* have the same connectivity. Thanks to this last property, the operations $(vsplit_l)_{l \in \{1, \ldots, K\}}$ are calculated on M* and applied to M. The decoder proceeds as follows: First, M* is simplified as previously described to generate PM(M*) with a base mesh that contains a single vertex $v_0$ (in the general case, one vertex per related component). The position of $v_0$ is decoded directly by applying equation (7) and by assuming that $v_0^*$ is empty (i.e. no neighbors). Then the operation $vsplit_1$ is applied. The position of the new vertex inserted $v_1$ is reconstructed using equation (7) and by considering its topological neighborhood in $M_1^*$. This process is reiterated for all the remaining vertices until the entire mesh has been decoded or until a predefined quality threshold is reached.

Figure 8:
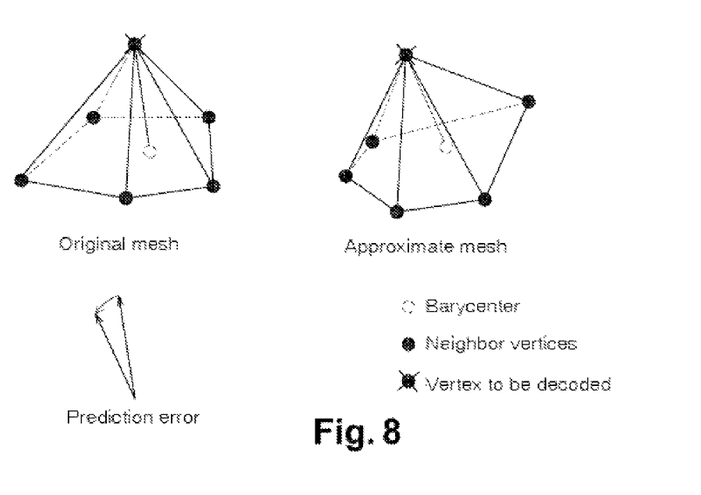
FIG. 8: a schematic representation of the prediction errors between the original mesh and the approximate mesh.

Quality scalability (progressive refining of the positions as the flow is being decoded) is obtained by reconstructing the positions of all the vertices, while setting the predicted approximation errors that are not yet available to zero in equation (7). At the beginning of the decoding process, none of these prediction errors is available. Assuming that these errors are null, the decoder makes the assumption that each vertex to be decoded is subjected to the same movement as that calculated on the approximate mesh M* (see FIG. 8). Such an assumption of course introduces reconstruction errors. In step with the interpretation of the binary flow, the prediction errors are decoded and utilized (i.e. by applying equation (7)) to progressively correct the positions of the vertices of the mesh. At the end of the transmission, all the positions will have been corrected. At this stage, only quantization errors remain.

BENEFITS OF THE INVENTION

It is understood that the method according to the invention transfers a portion of the mesh geometry calculations from the encoder to the decoder, which makes savings in bandwidth possible, in particular. The decoder handles the simplification of the mesh.

A key idea of the method is to approximate the object by a small proportion (typically 1-3%) of the mesh dots defined as control dots.

In the previous state of the art, mesh approximation using the Laplacian approach rests on a criterion that brings each vertex as close as possible to its neighbors' barycenter. The disadvantage of this uniform weighting of the neighbors' contributions is that it smooths the protruding shapes. In this method, a weighted barycenter of the protruding edges is used, which retranscribes the shape of the model more faithfully.

As described, the multi-resolution 3D mesh compression method uses a strategy based on a shape approximation, so as to compress and progressively transmit the geometry information, which represents about 80% of the total volume of information to be sent.

At the same time, this strategy allows: lossless encoding of connectivity; near lossless compression of the geometry and of the attributes; spatial and quality scalability.

To give an order of magnitude of the savings, the geometry of the mesh M, defined by the position of each vertex is usually encoded in 15 to 20 bpv ("bits per vertex") and the connectivity between vertices, i.e. the list of facets, represents 1 to 4 bpv, i.e. less than 20% of the total flow of data representing the mesh M.

Figure 6:
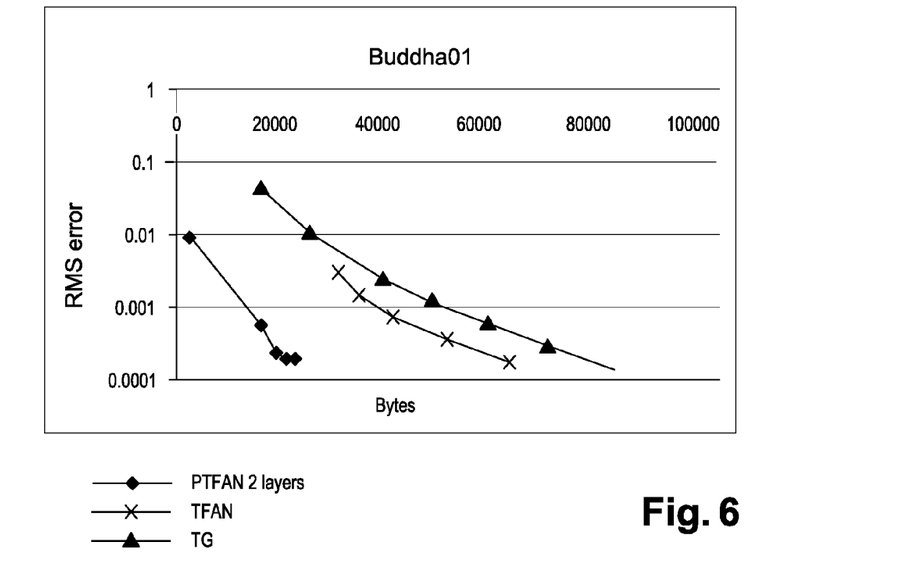
FIGS. 6 and 7: families of curves that highlight the gains made possible by a method according to the invention.
Figure 7:
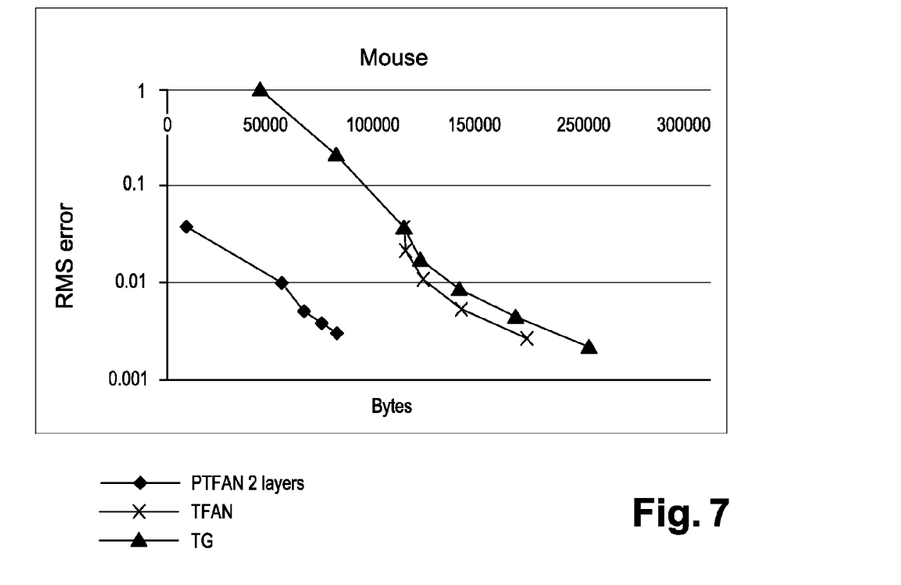

FIGS. 6 and 7 illustrate position errors (along the y-axis) depending on the size of the compressed binary flow (expressed in bytes) for various quantization steps, and compare three encoding/decoding methods including a TG [Touma'98] method, the TFAN method [Mammou'09] and the present method. As can be seen in these figures, a savings of 20 to 70% in terms of volume of data is obtained by using the method described, compared to previous techniques. In the context of current requirements in terms of quality and bandwidth, such a savings is highly significant.

VARIANTS OF THE INVENTION

The scope of this invention is not limited to the details of the embodiments considered above as an example, but on the contrary extends to modifications in the reach of the expert.

Figure 9:
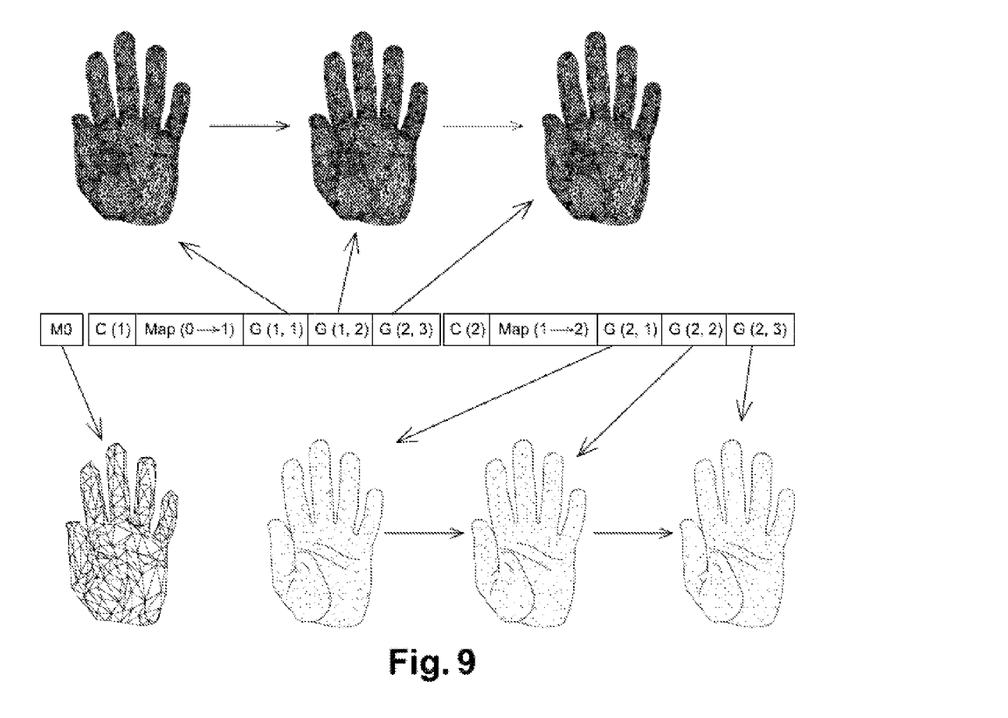
FIG. 9: a schematic diagram of a method variant that uses intermediate connectivity levels of detail.

The method described above encodes in single-rate the connectivity of the original mesh. This assumes that the decoder must reconstruct the approximate mesh M* by resolving the linear system of size (V×V) described by equation (2) (where V is the number of vertices of M). The induced calculation cost can then be too high for cases of dense meshes and for terminals of limited capacity. To overcome this limitation, a possible extension consists of introducing intermediate connectivity levels of detail, as illustrated in FIG. 9. Here, intermediate versions are calculated by the encoder, then transmitted progressively using the approach described above. Three levels of detail, $M_0$, $M_1$ and $M_2$, are considered in FIG. 9. The coarsest version $M_0$ (with connectivity and geometry) is first transmitted, directly utilizing the single-rate TFAN [Mammou'09] encoder. The vertices of $M_0$ are then utilized to predict the geometry of the next level of detail $M_1$. More specifically, the vertices of $M_0$ are utilized as control dots for $M_1$. This also requires sending the connectivity C(1) of $M_1$ and an auxiliary item of information, annotated Map(0→1), which describes the correspondence between the vertices of $M_0$ and of $M_1$. By utilizing $M_0$, Map (0→0) and C(1), the decoder calculates (as previously described) an approximate version of $M_1$, annotated $M_1^*$. $M_1^*$ is then utilized as a predictor for $M_1$. The predicted approximation errors are encoded/decoded progressively as described in the original approach. The same approach is then utilized to encode/decode $M_2$ based on $M_1$.

The invention claimed is:

1. A method for encoding/decoding three-dimensional meshes of dots or vertices connected in the form of facets delimited by edges; the mesh M is defined by connectivity data T and geometry data G;
   the method comprises:
   a step of lossless encoding of the connectivity data T into encoded connectivity data Tc,
   a step of iteratively generating a progressive mesh hierarchy, i.e. a set of meshes with progressive levels of detail, PM(M*),
   characterized in that it also comprises a step of generating a piecewise smooth approximation M* of the original mesh M, from the mesh connectivity T; this piecewise smooth approximation M* is described as follows:
   a. the encoded connectivity information Tc (the list of triangles of the mesh M),
   b. a small number N of control dots $C=(c_k)_{k \in \{1, \ldots, N\}}$, previously defined and
   c. a set of indexes S of edges, called protruding edges, of the mesh M, identified beforehand;
   the progressive mesh hierarchy PM(M*) is used to calculate a prediction of approximation errors in M* compared with the original mesh M.

2. The method according to claim 1, characterized in that the approximate mesh M* is generated according to a Laplacian technique, which has been generalized to the case of meshes comprising protruding edges, in that a Laplacian matrix L is defined in which weights ($\alpha$, $\beta$) are associated with the special edges (protruding or outer edges) and with the non-special edges; this makes it possible to assign different weights to the contribution of vertices close to a dot depending on their belonging to the two sets of special topological neighbors, which are defined as sharing with the two sets of special topological neighbors either an outer edge or a protruding edge, and normals $i_s^*$ and $i_n^*$.

3. The method according to claim 2, characterized in that the following values are used: $\alpha=100$ and $\beta=1$.

4. The method according to claim 1 characterized in that the progressive mesh hierarchy PM(M*) is generated by decimation of the approximate mesh M* by allowing only reversible half-edge collapse operations until a base mesh $M_0$ is reached; the original mesh M is then constructed as the base mesh $M_0$ associated with a set of operations of refining by vertex splitting.

5. The method according to claim 1 characterized in that it also comprises a step in which:
   the predicted approximation errors are encoded in the reverse order of PM(M*);
   the approximation error $e_v$ is decomposed into a component normal to the mesh M*: $e_v^n$ and two tangential components $e_v^t$ and $e_v^r$, which are transmitted progressively to a decoder (200).
   at the time of decoding, the predicted approximation errors are decoded progressively starting from the lowest level of detail $M_0$ to the highest level of detail M,
   the decoded positions of the vertices are calculated.

6. The method according to claim 1 characterized in that it also comprises the following steps:
   of encoding versions of intermediate connectivity levels of detail and of progressive transmission thereof;
   of transmitting the coarsest version $M_0$ of the mesh hierarchy (with connectivity and geometry) by using a TFAN type of single rate encoder;
   and, iteratively, of predicting the geometry of the next level of detail $M_{i+1}$ based of the vertices of M, with the vertices of $M_i$ being used as control dots for $M_{i+1}$;
      the following having been previously transmitted: the connectivity C(i+1) of $M_{i+1}$ and an auxiliary item of information annotated Map(i→i+1), which describes the correspondence between the vertices of $M_i$ and of $M_{i+1}$;
      a calculation of an approximate version of $M_{i+1}$, annotated $M_{i+1}^*$ being realized by the decoder by utilizing $M_i$, Map(i→i+1) and C(i+1);
      of using $M_{i+1}^*$ as predictor of $M_{i+1}$, with the prediction errors being encoded/decoded progressively.

7. A decoding method for a method according to claim 1, characterized in that at the time of decoding, the predicted approximation errors that are not yet available are set to zero, and in that, in step with the interpretation of the binary flow, the approximation errors are decoded and utilized to progressively correct the positions of the vertices of the mesh.

8. An encoder (100) for three-dimensional meshes, characterized in that it is configured:
   to receive and store:
      connectivity data T,
      geometry data G,
      references of user-selected "control dots" Cs, which dots make it possible to generate an approximate version of the original mesh M, where a subset represents 1% of the vertices of the mesh,
   a single rate type of connectivity encoder (11), i.e. without scalability, designed for lossless encoding of the connectivity data T into compressed connectivity data Tc,
   a quantization module (12) designed to process the geometry data G in order to reduce the volume of information to be transmitted for each vertex,
   a control dot selection module (13) utilizing: the quantized geometry data $G_Q$; the compressed connectivity data Tc; and the user control dot data Cs to provide the selected control dots C;
   a protruding edge detection module (16), designed to use the compressed connectivity data Tc and the geometry data;
   a binarization module (17) to produce the compressed indexes of the protruding edges $S_C$ and the compressed indexes and positions of the control dots $C_C$;
   a mesh approximation module (21) designed to integrate the selected control dot data C and the compressed connectivity data Tc; this mesh approximation module (21) generates an approximate mesh M*;
   a mesh decimation module (22), designed to provide a progressive mesh PM(M*) based on the approximate mesh M* and the quantized geometry data $G_Q$;
   an prediction module (23) for approximation errors $e_v$, designed to use the data output from the mesh decimation module (22)
   from which compressed error prediction data $e_{vc}$ are output, after compression by an arithmetical encoder;
   and to transmit:
      compressed connectivity data Tc;
      compressed indexes of protruding edges $S_C$;
      compressed indexes and positions of the control dots $C_C$;
      and compressed error prediction data $e_{vc}$.

9. The encoder according to claim 8, characterized in that the mesh approximation module is designed to generate the approximate mesh M* according to a Laplacian technique, which has been generalized to the case of meshes comprising protruding edges.

10. The encoder according to claim 9, characterized in that it is configured to generate Laplacian matrix L, in which weights (α, β) are associated with the special edges (protruding or outer edges) and with the non-special edges; this makes it possible to assign different weights to the contribution of vertices close to a dot depending their belonging to the two sets of special topological neighbors, which are defined as sharing with the two sets of special topological neighbors either an outer edge or a protruding edge, and normals $i_s^*$ and $i_n^*$.

11. A decoder (200) for three-dimensional meshes, characterized in that it is configured:
   to receive and store:
      compressed connectivity data Tc;
      compressed indexes of protruding edges $S_C$;
      compressed indexes and positions of the control dots $C_C$;
      and compressed error prediction data $e_{vc}$;
   a single-rate connectivity decoder (31) designed to provide reconstituted connectivity data T' from the compressed connectivity data Tc;
   an inverse binarization module (37) designed to provide indexes of the protruding edges S', indexes and positions of the control dots C' and compression error prediction data $e_v$';
   a mesh approximation module (41) designed to combine reconstituted connectivity data T', indexes of protruding edges S and indexes and positions of the control dots C';
   a mesh decimation module (42) designed to use the approximate mesh M* to obtain a progressive mesh PM(M*),
   an inverse approximation error prediction module (43) designed to combine the progressive mesh data PM(M*) with the compression error prediction data $e_v$';
   an inverse quantization module (32) able to provide reconstituted geometry data G' based on the results of the inverse approximation error prediction module.

* * * * *